(12) United States Patent
Hicks et al.

(10) Patent No.: US 6,237,896 B1
(45) Date of Patent: May 29, 2001

(54) PORTABLE FAN WITH MISTING NOZZLES

(76) Inventors: Ricky D. Hicks; Lee A. Criswell, both of 5301 Brighton, Kansas City, MO (US) 64130

( * ) Notice: Subject to any disclaimer, the term of this patent is extended or adjusted under 35 U.S.C. 154(b) by 0 days.

(21) Appl. No.: 09/426,153

(22) Filed: Oct. 22, 1999

(51) Int. Cl.$^7$ ...................................... B01F 3/04
(52) U.S. Cl. ........................ 261/28; 261/5; 261/30; 261/89; 261/90; 261/DIG. 43
(58) Field of Search ................. 261/5, 28, 30, 261/37, 89, 90, 78.2, DIG. 3, DIG. 43

(56) References Cited

U.S. PATENT DOCUMENTS

| | | |
|---|---|---|
| D. 154,927 | 8/1949 | Jones . |
| 1,379,831 * | 5/1921 | Lindauer ................... 261/90 |
| 1,606,363 * | 11/1926 | Gosline ..................... 261/90 |
| 1,730,866 * | 10/1929 | Sternberg .................. 261/30 |
| 1,861,340 * | 5/1932 | Fox .......................... 261/29 |
| 1,962,650 * | 6/1934 | Torrebadella .............. 261/90 |
| 1,981,767 * | 11/1934 | Zellweger ................. 261/90 |
| 2,063,921 | 12/1936 | Gray . |
| 2,238,120 * | 4/1941 | Launder .................... 261/30 |
| 2,551,789 * | 5/1951 | Copley ...................... 261/30 |
| 3,192,167 * | 6/1965 | Ogawa et al. .............. 261/89 |
| 3,997,115 | 12/1976 | Licudine . |
| 4,353,846 * | 10/1982 | Mehrens et al. ............ 261/5 |
| 4,657,712 * | 4/1987 | Milbocker ................. 261/90 |
| 4,839,106 | 6/1989 | Steiner . |
| 5,620,633 | 4/1997 | Junkel et al. . |
| 5,667,732 | 9/1997 | Lederer . |
| 5,843,344 * | 12/1998 | Junkel et al. ............... 261/28 |
| 6,086,053 * | 7/2000 | Natschke et al. ........... 261/30 |

FOREIGN PATENT DOCUMENTS

424634 * 2/1935 (GB) ........................ 261/89

* cited by examiner

Primary Examiner—C. Scott Bushey

(57) ABSTRACT

A portable fan with misting nozzles for providing a cooling mist to the air flow of a fan. The portable fan with misting nozzles includes a fan assembly adapted for creating an air flow. A water supply assembly for storing water. A plurality of nozzles adapted for spraying a mist of water into the air flow of the fan assembly. The nozzles are in fluid communication with the water supply assembly. The nozzles are coupled to the fan assembly.

19 Claims, 3 Drawing Sheets

PORTABLE FAN WITH MISTING NOZZLES

BACKGROUND OF THE INVENTION

1. Field of the Invention

The present invention relates to misting fans and more particularly pertains to a new portable fan with misting nozzles for providing a cooling mist to the air flow of a fan.

2. Description of the Prior Art

The use of misting fans is known in the prior art. More specifically, misting fans heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,667,732; 5,620,633; 2,063,921; 4,839,106; 3,997,115; and U.S. Pat. No. Des. 154,927.

While these devices fulfill their respective, particular objectives and requirements, the aforementioned patents do not disclose a new portable fan with misting nozzles. The inventive device includes a fan assembly adapted for creating an air flow. A water supply assembly for storing water. A plurality of nozzles adapted for spraying a mist of water into the air flow of the fan assembly. The nozzles are in fluid communication with the water supply assembly. The nozzles are coupled to the fan assembly.

In these respects, the portable fan with misting nozzles according to the present invention substantially departs from the conventional concepts and designs of the prior art, and in so doing provides an apparatus primarily developed for the purpose of providing a cooling mist to the air flow of a fan.

SUMMARY OF THE INVENTION

In view of the foregoing disadvantages inherent in the known types of misting fans now present in the prior art, the present invention provides a new portable fan with misting nozzles construction wherein the same can be utilized for providing a cooling mist to the air flow of a fan.

The general purpose of the present invention, which will be described subsequently in greater detail, is to provide a new portable fan with misting nozzles apparatus and method which has many of the advantages of the misting fans mentioned heretofore and many novel features that result in a new portable fan with misting nozzles which is not anticipated, rendered obvious, suggested, or even implied by any of the prior art misting fans, either alone or in any combination thereof.

To attain this, the present invention generally comprises a fan assembly adapted for creating an air flow. A water supply assembly for storing water. A plurality of nozzles adapted for spraying a mist of water into the air flow of the fan assembly. The nozzles are in fluid communication with the water supply assembly. The nozzles are coupled to the fan assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the desiging of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable fan with misting nozzles apparatus and method which has many of the advantages of the misting fans mentioned heretofore and many novel features that result in a new portable fan with misting nozzles which is not anticipated, rendered obvious, suggested, or even implied by any of the prior art misting fans, either alone or in any combination thereof.

It is another object of the present invention to provide a new portable fan with misting nozzles which may be easily and efficiently manufactured and marketed.

It is a further object of the present invention to provide a new portable fan with misting nozzles which is of a durable and reliable construction.

An even further object of the present invention is to provide a new portable fan with misting nozzles which is susceptible of a low cost of manufacture with regard to both materials and labor, and which accordingly is then susceptible of low prices of sale to the consuming public, thereby making such portable fan with misting nozzles economically available to the buying public.

Still yet another object of the present invention is to provide a new portable fan with misting nozzles which provides in the apparatuses and methods of the prior art some of the advantages thereof, while simultaneously overcoming some of the disadvantages normally associated therewith.

Still another object of the present invention is to provide a new portable fan with misting nozzles for providing a cooling mist to the air flow of a fan.

Yet another object of the present invention is to provide a new portable fan with misting nozzles which includes a fan assembly adapted for creating an air flow. A water supply assembly for storing water. A plurality of nozzles adapted for spraying a mist of water into the air flow of the fan assembly. The nozzles are in fluid communication with the water supply assembly. The nozzles are coupled to the fan assembly.

Still yet another object of the present invention is to provide a new portable fan with misting nozzles that provides a portable means of providing a forced air flow to an area.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
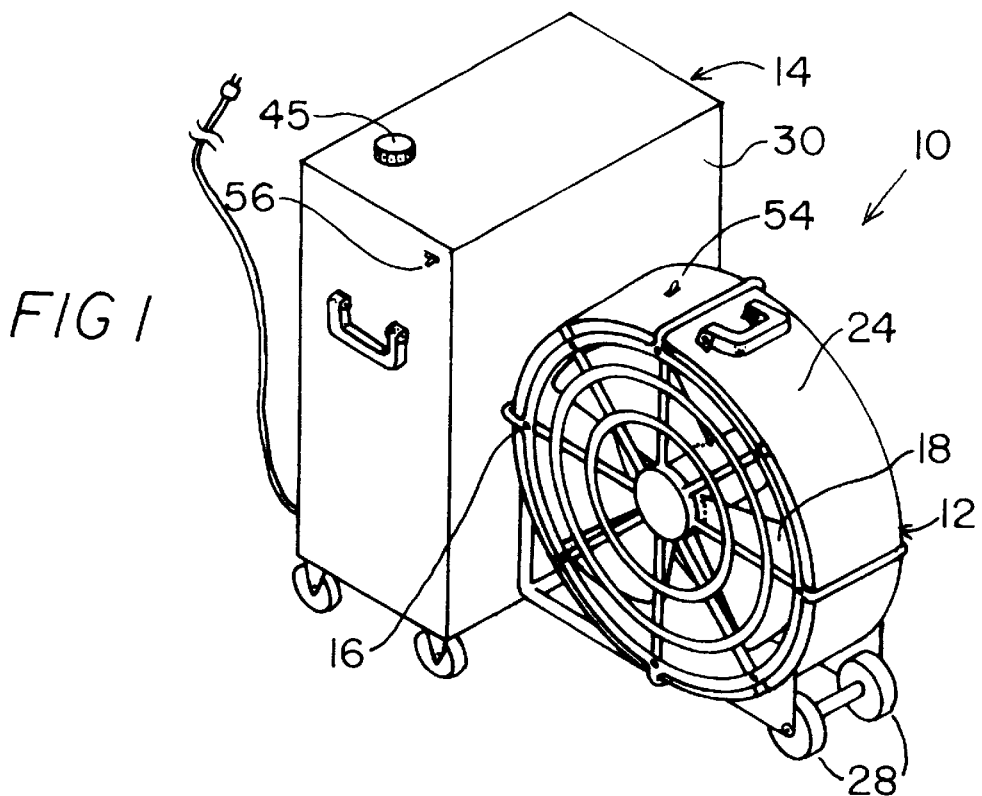
FIG. 1 is a perspective view of a new portable fan with misting nozzles according to the present invention.
Figure 2:
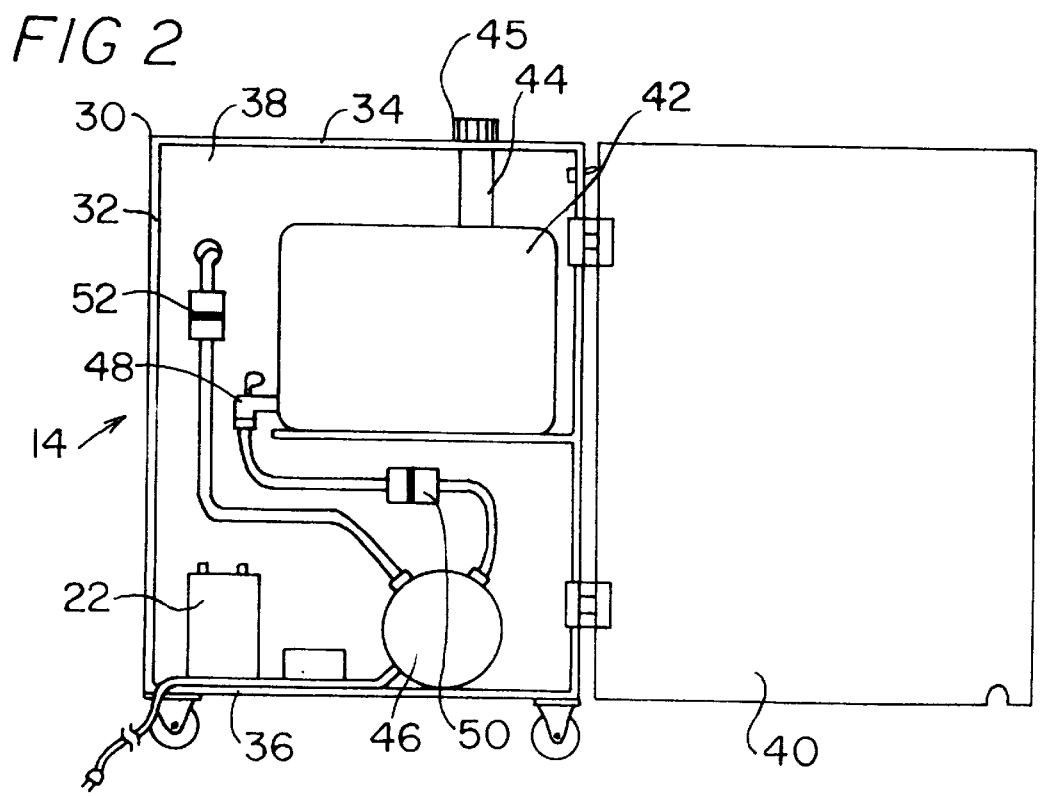
FIG. 2 is an enlarge view of the water supply assembly of the present invention.

With reference now to the drawings, and in particular to FIGS. 1 through 6 thereof, a new portable fan with misting nozzles embodying the principles and concepts of the present invention and generally designated by the reference numeral 10 will be described.

As best illustrated in FIGS. 1 through 6, the portable fan with misting nozzles 10 generally comprises a fan assembly 12 adapted for creating an air flow. A water supply assembly 14 for storing water. The water supply assembly is coupled to the fan assembly.

Figure 3:
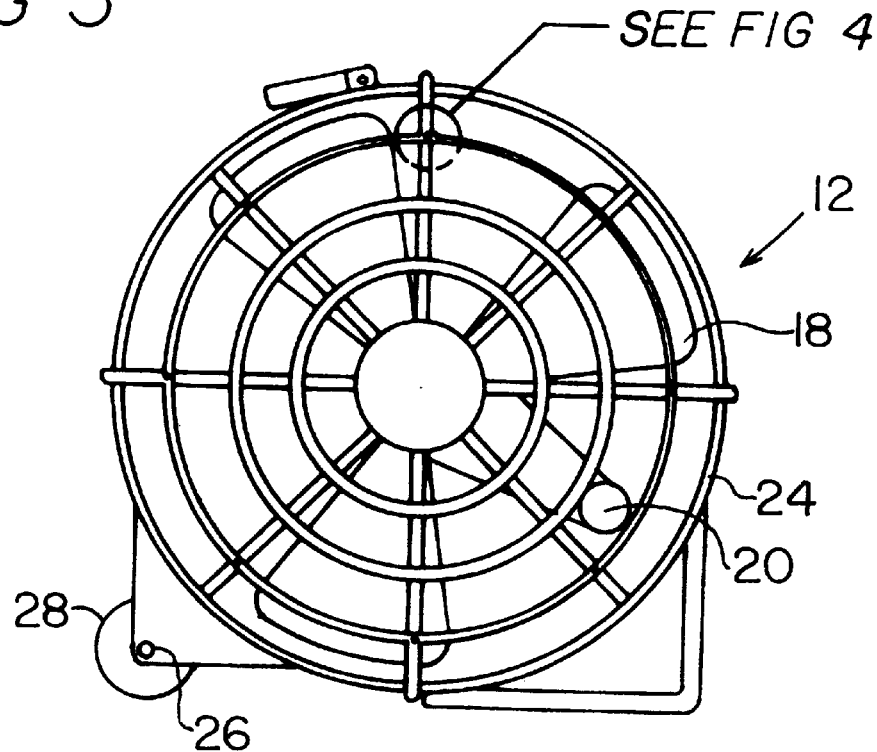
FIG. 3 is an enlarge view of the fan assembly of the present invention.
Figure 4:
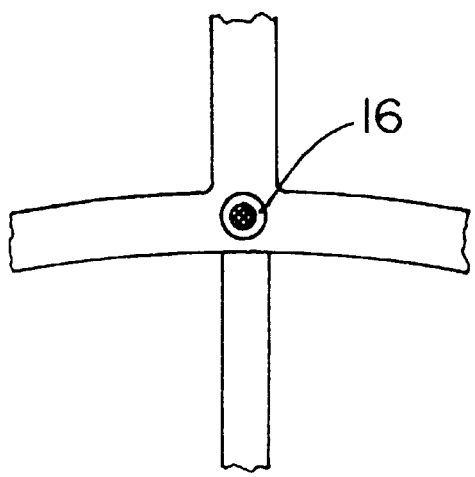
FIG. 4 is a is an enlarged view of one of the nozzles of the present invention as indicated by the area designated as 4 in FIG. 3.
Figure 5:
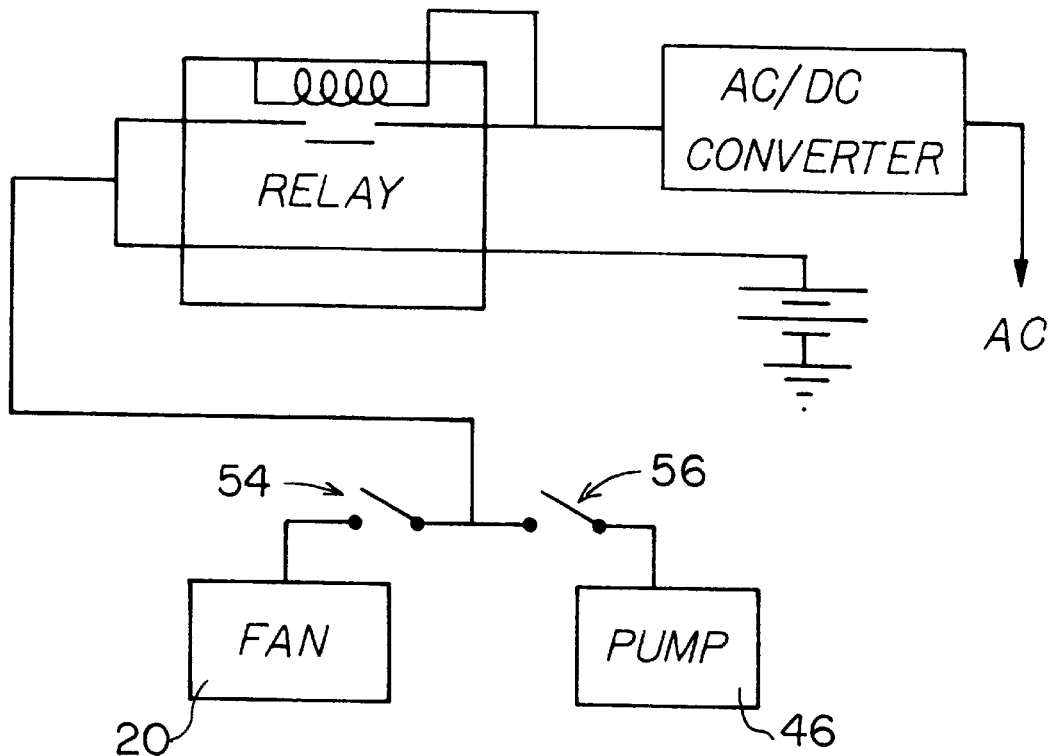
FIG. 5 is a an electrical schematic of the switches of the present invention.

As shown in FIGS. 3 and 4, a plurality of nozzles 16 are adapted for spraying a mist of water into the air flow of the fan assembly. The nozzles are in fluid communication with the water supply assembly. The nozzles are coupled to the fan assembly.

The fan assembly, as shown in FIGS. 1 and 3, has a plurality of fan blades 18 operationally coupled to a motor 20. The fan blades having preferable dimensions of ten and half inches in width and eighteen inches in length. The motor is operationally coupled to a power supply 22. The motor should be able to supply one-half horse power with 1725 rotations per minute. The fan assembly has a first housing 24 enclosing the fan blades and the motor. The first housing has an axle 26 coupled thereto. At least one wheel 28 is rotatably coupled to the axle for facilitating relocation of the fan assembly. The first housing has an annular configuration. An inner diameter of the first housing is greater than a distance across two opposing fan blades.

The water supply assembly has a second housing 30. The second housing has a pair of end walls 32, a top wall 34, a bottom wall 36 and a rear wall 38. The walls defining an interior space therebetween. A first of the end walls has an opening. A door 40 is coupled to the first end wall for closing the opening. The water supply assembly has a liquid container 42 in fluid communication with the nozzles. A refill neck 44 of the liquid container upwardly extending through the top wall of the second housing. A cap 45 for removably attaching to the refill neck. A pump 46 is fluidly coupled between the liquid container and the nozzles for pumping liquid from the liquid container to the nozzles. The liquid container has a spigot 48 fluidly coupled to the pump for controlling fluid communication between the liquid container and the pump. The pump has a motor which is operationally coupled to the power source. The pump is located in the interior space of the second housing.

A first filter 50 is fluidly coupled between the liquid container and the pump for removing impurities from the liquid prior to the liquid entering the pump. A second filter 52 is fluidly coupled between the pump and the nozzles for removing impurities from the liquid prior to the liquid being emitted from the nozzles.

A fan switch 54 is for controlling the fan. The fan switch is operationally coupled between the motor and the power source. A pump switch 56 is for controlling activation of the pump. The pump switch is operationally coupled between the pump and the fan switch such that the pump will not be activated upon actuation of the pump switch unless the fan switch is closed.

Figure 6:
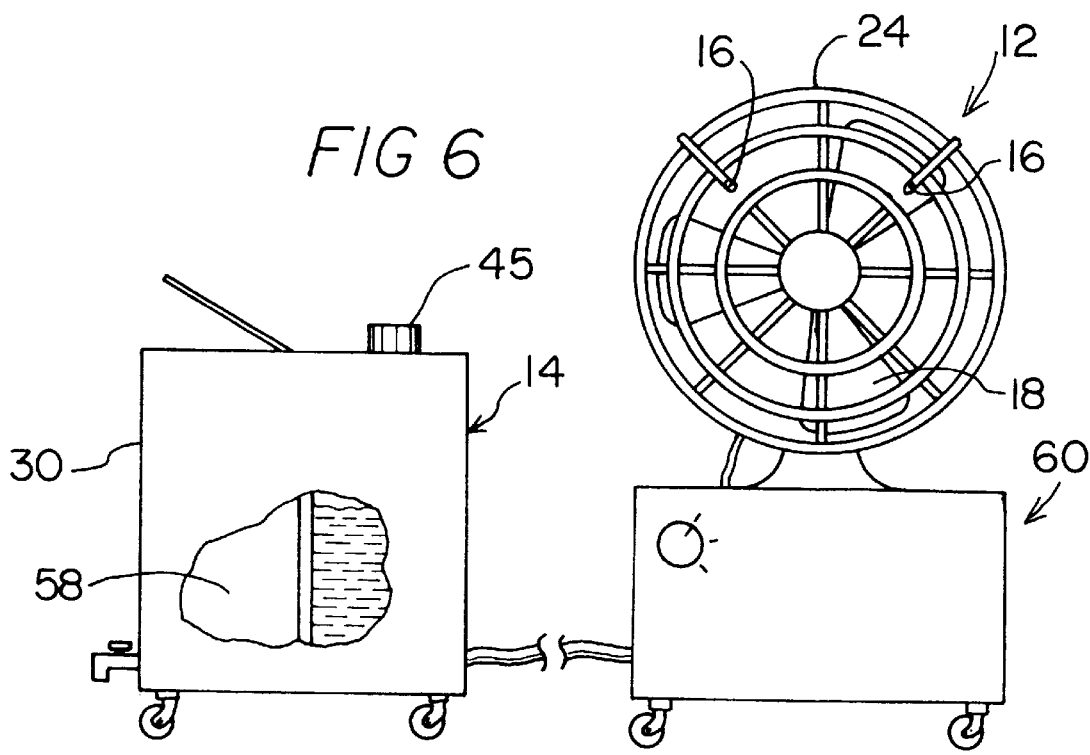
FIG. 6 is an elevational view on an embodiment of the present invention.

In an embodiment, as shown in FIG. 6, the water storage assembly has a first container 58 and the liquid container. The first container is for storing items to keep them at a cool temperature. The liquid container is for storing liquid and has a refill neck extending upwardly from the liquid container. The embodiment further comprises an intermediate assembly 60. The intermediate assembly has the pump in fluid communication between the liquid container and the nozzles. The intermediate assembly has a rechargeable power source operationally coupled to the motor of the pump and the motor of the fan assembly.

In use, the user would position the fan assembly such that the air flow traveled in the desired direction. The fan switch would then be actuated and the fan would begin to operate. The pump switch would then be actuated so that the motor of the pump would start pumping water from the liquid container to the nozzles which would then produce a mist that would be introduce into the air flow provided by the fan assembly. The mist would provide an increased cooling effect over the simple use of the fan. To prevent damage the fan switch has to be actuated before the pump switch can be actuated to prevent water from coming in contact with the motor of the fan assembly.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A portable cooling unit comprising:
   a fan assembly adapted for creating an air flow;
   a water supply assembly for storing water;
   a plurality of nozzles adapted for spraying a mist of water into the air flow of said fan assembly, said nozzles being in fluid communication with said water supply assembly, said nozzles being coupled to said fan assembly; and wherein said water supply assembly has a second housing, said second housing having a pair of end walls, a top wall, a bottom wall and a rear wall, said walls defining an interior space therebetween, a first of said end walls having an opening, a door being coupled to said first end wall for closing said opening.

2. The portable cooling unit as set forth in claim 1 wherein said fan assembly has a plurality of fan blades operationally coupled to a motor, said motor being operationally coupled to a power supply.

3. The portable cooling unit as set forth in claim 2 wherein said fan assembly has a first housing enclosing said fan blades and said motor.

4. The portable cooling unit as set forth in claim 3 wherein said first housing has an axle coupled thereto, at least one wheel being rotatably coupled to said axle for facilitating relocation of said fan assembly.

5. The portable cooling unit as set forth in claim 4 wherein said first housing has an annular configuration, an inner diameter of said first housing is greater than a distance across two opposing fan blades.

6. The portable cooling unit as set forth in claim 3 wherein said nozzles are located along an upper half of said first housing such that said nozzles are positioned between a center of said first housing and a length of one of said fan blades away from the center of said housing.

7. The portable cooling unit as set forth in claim 1 wherein said water supply assembly has a liquid container in fluid communication with said nozzles, said liquid container having a refill neck extending upwardly through said top wall of said second housing, a cap for removably attaching to said refill neck.

8. The portable cooling unit as set forth in claim 7 wherein said water supply assembly has a pump fluidly coupled between said liquid container and said nozzles for pumping liquid from said liquid container to said nozzles, said pump having a motor being operationally coupled to a power source.

9. The portable cooling unit as set forth in claim 8 wherein said water supply assembly has a first filter fluidly coupled between said liquid container and said pump.

10. The portable cooling unit as set forth in claim 8 wherein said water supply assembly has a second filter fluidly coupled between said pump and said nozzles.

11. The portable cooling unit as set forth in claim 8 wherein said liquid container has a spigot fluidly coupled to said pump for controlling fluid communication between said liquid container and said pump.

12. The portable cooling unit as set forth in claim 1 wherein said water supply assembly is coupled to fan assembly.

13. The portable cooling unit as set forth in claim 1 wherein said water supply assembly has a first container and a liquid container, said first container being for storing items, said liquid container being for storing liquid and having a refill neck extending upwardly from said liquid container.

14. The portable cooling unit as set forth in claim 13 further comprising an intermediate assembly, said intermediate assembly having a pump in fluid communication between said liquid container and said nozzles.

15. The portable cooling unit as set forth in claim 14 wherein said intermediate assembly has a rechargeable power source operationally coupled to a motor of said pump and a motor of the fan assembly.

16. A cooling unit comprising:
a fan assembly adapted for creating an air flow;
a water supply assembly for storing water, said water supply assembly being coupled to said fan assembly;
a plurality of nozzles adapted for spraying a mist of water into the air flow of the fan assembly, said nozzles being in fluid communication with said water supply assembly, said nozzles being coupled to said fan assembly;

said fan assembly having a plurality of fan blades operationally coupled to a motor, said motor being operationally coupled to a power supply, said fan assembly having a first housing enclosing said fan blades of said motor, said first housing having an axle coupled thereto, at least one wheel being rotatably coupled to said axle for facilitating relocation of said fan assembly, said first housing having an annular configuration, an inner diameter of said first housing being greater than a distance across two opposing fan blades;

said water supply assembly having a second housing, said second housing having a pair of end walls, a top wall, a bottom wall and a rear wall, said walls defining an interior space therebetween, a first of said end walls having an opening, a door being coupled to said first end wall for closing said opening, said water supply assembly having a liquid container in fluid communication with said nozzles, a refill neck of said liquid container upwardly extending through said top wall of said second housing, a cap for removably attaching to said refill neck, a pump being fluidly coupled between said liquid container and said nozzles for pumping liquid from said liquid container to said nozzles, said liquid container having a spigot fluidly coupled to said pump for controlling fluid communication between said liquid container and said pump, said pump having a motor being operationally coupled to said power supply, said pump being located in said interior space of said second housing;

a first filter being fluidly coupled between said liquid container and said pump for removing impurities from the liquid prior to the liquid entering said pump;

a second filter being fluidly coupled between said pump and said nozzles for removing impurities from the liquid prior to the liquid being emitted from said nozzles;

a fan switch for controlling said fan, said fan switch being operationally coupled between said motor and said power supply; and a pump switch for controlling activation of said pump, said pump switch being operationally coupled between said pump and said fan switch such that said pump will not be activated upon actuation of said pump switch unless said fan switch is actuated to an on position.

17. A portable cooling unit comprising:
a fan assembly adapted for creating an air flow;
a water supply assembly for storing water;
a plurality of nozzles adapted for spraying a mist of water into the air flow of said fan assembly, said nozzles being in fluid communication with said water supply assembly, said nozzles being coupled to said fan assembly; and wherein said water supply assembly has a first container and a liquid container, said first container being for storing items, said liquid container being for storing liquid and having a refill neck extending upwardly from said liquid container.

18. The portable cooling unit as set forth in claim 17 further comprising an intermediate assembly, said intermediate assembly having a pump in fluid communication between said liquid container and said nozzles.

19. The portable cooling unit as set forth in claim 18 wherein said intermediate assembly has a rechargeable power source operationally coupled to a motor of said pump and a motor of the fan assembly.

* * * * *